United States Patent [19]
Labuda

[11] Patent Number: 5,995,152
[45] Date of Patent: *Nov. 30, 1999

[54] VIDEO MONITOR WHICH SUPERIMPOSES A HIGH FREQUENCY PERIODIC WAVE OVER SIGNALS TO VERTICAL DEFLECTION PLATES TO INCREASE DISPLAY QUALITY IN LOW RESOLUTION MODES

[75] Inventor: Paul Labuda, Austin, Tex.

[73] Assignee: Dell USA, L.P., A Texas Limited Partnership, Round Rock, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/592,269

[22] Filed: Jan. 26, 1996

[51] Int. Cl.⁶ .............................. H04N 7/01; H04N 11/20; H04N 3/28
[52] U.S. Cl. ........................................... 348/428; 348/206
[58] Field of Search .................................... 348/805, 206, 348/173, 377, 625, 626, 628, 629, 428; 315/371, 392, 393, 394, 395, 30; 327/126, 131, 139; H04N 5/68, 9/16

[56] References Cited

U.S. PATENT DOCUMENTS

| | | |
|---|---|---|
| 2,143,933 | 1/1939 | Barthelemy ............................. 348/805 |
| 2,222,934 | 11/1940 | Blumlein ................................. 348/206 |
| 3,418,519 | 12/1968 | Ferrier, Jr. et al. ..................... 315/393 |
| 3,792,196 | 2/1974 | Wendland ............................... 348/206 |
| 4,301,473 | 11/1981 | Wallace et al. .......................... 348/634 |
| 4,612,482 | 9/1986 | Beamon, III et al. .................. 315/371 |
| 4,710,799 | 12/1987 | Songer ..................................... 348/428 |
| 4,725,756 | 2/1988 | Kaplan . |
| 5,162,694 | 11/1992 | Capek et al. . |
| 5,198,730 | 3/1993 | Vancil . |

*Primary Examiner*—Michael H. Lee
*Attorney, Agent, or Firm*—Skjerven, Morrill, MacPherson, Franklin & Friel, L.L.P.; Stephen A. Terrile

[57] ABSTRACT

A video monitor including logic circuitry which superimposes a high frequency periodic wave on the vertical positioning provided by the monitor's vertical deflection plates in low resolution modes. The waveform operates to slightly and periodically adjust the electromagnetic output of the vertical deflection plates, enabling the electron beam to pass through the shadow mask in a plurality of locations. In low resolution modes, the electron beam passes through additional holes in the shadow mask line that formerly presented a black stripe, thus enabling additional pixels to be struck and causing the black lines to disappear. This creates the appearance of a larger electron beam without changing the electron gun or adding additional deflection hardware.

26 Claims, 4 Drawing Sheets

VIDEO MONITOR WHICH SUPERIMPOSES A HIGH FREQUENCY PERIODIC WAVE OVER SIGNALS TO VERTICAL DEFLECTION PLATES TO INCREASE DISPLAY QUALITY IN LOW RESOLUTION MODES

FIELD OF THE INVENTION

The present invention relates to computer video monitors, and more particularly to a video monitor which superimposes a high frequency periodic wave over the vertical positioning signals provided to the monitor's vertical deflection plates to increase the display quality of large video monitors at low resolution modes.

DESCRIPTION OF THE RELATED ART

Desktop computer video monitors continue to increase in both size and resolution. For example, in the past, 14 inch video monitors having a 640×480 pixel video display were common. However, today 17 inch monitors are becoming increasingly common, and 20 and 21 inch monitors are also becoming prevalent. Resolutions have also increased. For example, in the past, a standard VGA display had a resolution of 640×480 pixels in graphics mode and a resolution of 720×400 pixels in text mode. Currently, resolutions of 800×600; 1024×768; 1280×1024; and 1600×1200 are commonplace.

Computer video monitors are based on cathode ray tube (CRT) technology. Cathode ray tubes are a special form of vacuum tube wherein the cathode, i.e., a negatively charged electrode, at one end of the tube generates one or more beams or rays of electrodes towards the positively charged electrode, referred to as the anode. The cathode of a CRT is often referred to as an electron gun.

The cathode ray tube or CRT is generally narrow at the cathode end, referred to as the neck, and widens out at the anode end, referred to as the funnel, where the screen is located. Thus the cathode is positioned in the neck of the CRT and generates electron beams toward the wide end of the tube, i.e., the screen. The face or screen of the CRT includes a layer of phosphorous compounds (phosphors). The electrons from the cathode or electron gun travel through the neck of the tube to the inside of the face of the tube and strike the phosphors. The phosphors glow when struck by the electron beam, thus producing the images on the screen of a video monitor.

One or more powerful electromagnets are arranged around the tube and are referred to as the yoke. These electromagnets bend the electron beam in the course of its flight to move the beam across the tube face. The magnetic field generated by the yoke is carefully controlled and causes the beam to sweep each individual display line or scan line on the face of the tube. The monitor may also comprise vertical deflection plates which adjust the vertical position of the beam, and horizontal deflection plates which adjust the horizontal position of the beam.

Color video monitor displays typically use three different phosphors painted in fine patterns across the inner surface of the tube. These patterns are comprised of dots or stripes of the three additive primary colors, red, green and blue, arrayed next to each other. A grouping of three dots in primary colors is referred to as a triad or color triplet. A triad of dots forms a picture element referred to as a pixel.

Whereas monochrome video monitors generally have a single electron gun that continuously sweeps across the screen, most color video monitors include three electron guns and/or three electron emitting cathodes associated with each of the primary colors. The three guns or cathodes in the color video monitor generally emit the electrons simultaneously, and the three resulting beams are steered together by the yoke or electromagnets within the monitor. Convergence controls are generally available to ensure that each beam falls exactly on the same triplet of color dots on the screen as others. Thus, the convergence controls help the three beams to converge on the same triad.

Color video monitors generally include a shadow mask to define beam paths between the electron guns and the phosphor areas. The shadow mask is a metal sheet including fine perforations located inside the display tube at a short distance behind the phosphor coating on the display screen. The shadow mask is critically arranged with the phosphor dot coating on the CRT screen so that the respective electron beam can only hit phosphor dots of the respective color, i.e., the other two colors of dots are in the shadow of the mask and cannot be affected by the electron beam. The shadow mask thus prevents electron beams directed at respective dots comprising a triplet from spilling over and hitting other dots on the triplet. If one or more of the electron beams spill over and impact other dots within the triplet of the pixel being displayed, this results in a loss of color purity. The shadow mask operates to prevent this effect and helps make images as sharp and colorful as possible.

Larger monitors with higher resolutions include a large number of phosphors or pixels for high resolution modes. One problem that has arisen with the increased size and resolution of modern color video monitors is that the electron beam must be tightly focused to perform optimally in high resolution modes. However, on a sufficiently large monitor, for example a 21 inch monitor, low resolution modes such as the VGA 720×400 pixel text mode, or the 640×480 graphics mode, show horizontal black stripes in between scan lines.

This problem occurs because the electron beam is tightly focused to perform optimally at high resolutions and is thus too small to properly create a larger dot or pixel at low resolution modes. At low resolution modes, the tightly focused electron beam and large number of video screen pixels result in gaps or horizontal black stripes between scan lines. As the resolution is increased, these black stripes shrink as the scan lines grow closer together and eventually disappear when the number of horizontal scan lines becomes great enough.

Therefore, an improved video monitor system and method is desired which allows large monitors with high resolution modes to operate properly and clearly in low resolution modes.

SUMMARY OF THE INVENTION

The present invention comprises a video monitor including logic circuitry which superimposes a high frequency periodic wave on the vertical positioning signals provided to the monitor's vertical deflection plates in low resolution modes. The waveform operates to slightly and periodically adjust the electromagnetic output of the vertical deflection plates, enabling the electron beam to pass through the shadow mask in a plurality of locations in adjacent scan lines. The electron beam passes through additional holes in the shadow mask and impacts pixels in respective scan lines that formerly presented a black stripe, thus causing the black lines to disappear. This creates the appearance of a larger electron beam without changing the electron gun or adding additional deflection hardware.

A video monitor according to the present invention comprises a cathode ray tube including one or more electron guns that continuously sweep across the screen. The video monitor further includes a display screen coated with phosphors or other display elements. The video monitor includes electromagnets or deflection plates, including horizontal and vertical deflection plates, which position or guide the electron beams generated by the CRT. The video monitor further includes a shadow mask or aperture grill positioned inside the display tube a short distance behind the phosphor coating of the screen.

The video monitor further comprises a high frequency oscillator according to the present invention placed in conjunction with the vertical deflection circuitry. In low resolution modes, the high frequency oscillator creates a periodic wave which is superimposed on the electrical signals provided to the vertical deflection plates. Thus the magnetic charge produced by the vertical deflection plates oscillates based on the periodic wave, causing the electron beam to pass through additional holes in the shadow mask and impacts pixels in respective scan lines that formerly presented a black stripe. In one embodiment, the period and magnitude of the periodic wave is adjusted based on the resolution and monitor size, as desired.

BRIEF DESCRIPTION OF THE DRAWINGS

A better understanding of the present invention can be obtained when the following detailed description is considered in conjunction with the following drawings, in which.

DETAILED DESCRIPTION OF THE PREFERRED EMBODIMENT

Incorporation by Reference

For information on computer video monitors and operation of cathode ray tubes, please see Keller, Peter, *The Cathode Ray Tube, History, Theory, and Applications.*, Palisades Press, ISBN 0-9631559-0-3, which is hereby incorporated by reference in its entirety.

U.S. Pat. No. 5,198,730 is hereby incorporated by reference in its entirety.

Figure 1:
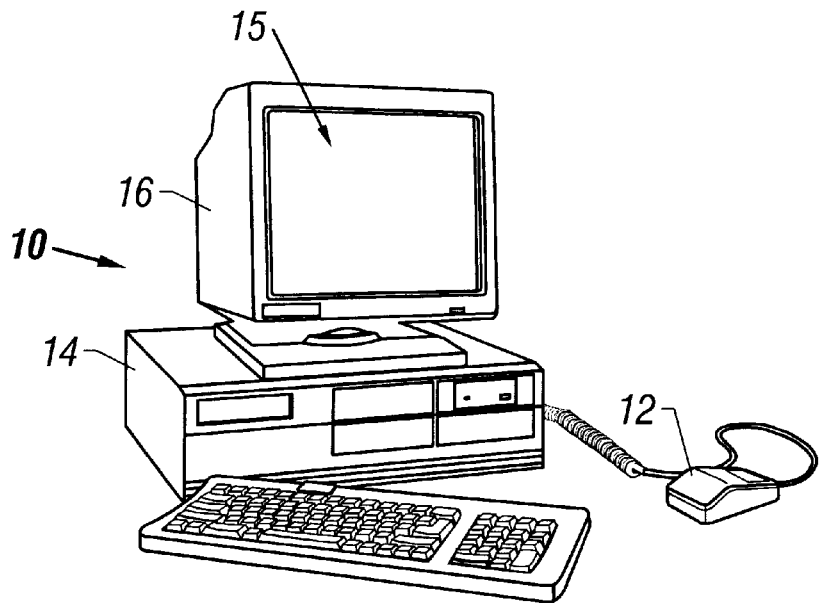
FIG. 1 illustrates a computer system including a color video monitor according to the present invention.

FIG. 1—Computer System

Referring now to FIG. 1, a computer system 10 including a video monitor 16 according to an embodiment is shown. It is noted that the present invention may be comprised in any of various devices which include a cathode ray tube. An embodiment is comprised in a computer system video monitor.

As shown, the computer system 10 includes a system unit 14 and video monitor 16. The computer system unit 14 includes various components comprised in a standard computer system, including a power supply, central processing unit (CPU), one or more of a hard drive and/or floppy drive, a video controller and other components and circuitry (all not shown), as is well known to those skilled in the art. A pointing device such as a mouse 12 is preferably connected to the computer system via cable 13. The computer system 10 also preferably includes a keyboard (not shown).

Figure 2:
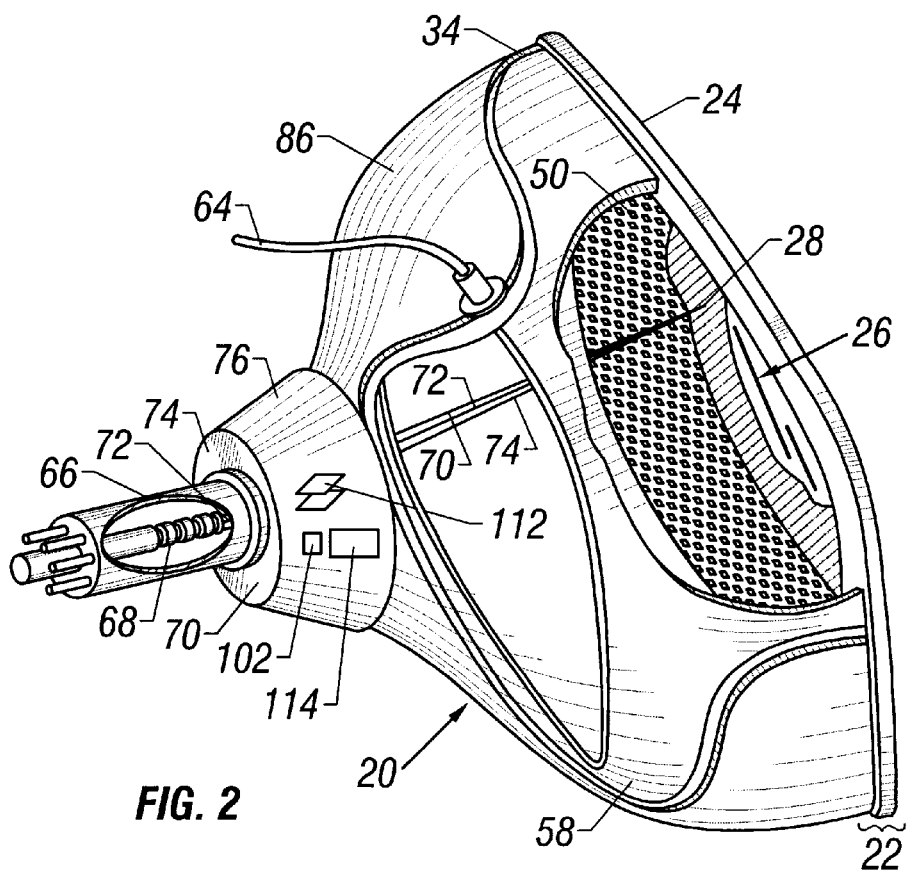
FIG. 2 illustrates the internal components of the cathode ray tube in the video monitor of FIG. 1.

The computer system video monitor 16 includes display screen 15, wherein the display screen comprises the screen portion of a cathode ray tube. The computer system video monitor 16 operates at a plurality of video resolution modes, including high resolution modes and low resolution modes.
FIG. 2—Cathode Ray Tube Referring now to FIG. 2, an exemplary cathode ray tube 20 according to one embodiment invention is shown. It is noted that the cathode ray tube 20 shown in FIG. 2 is illustrative and exemplary only, and the present invention may be used in any of various cathode ray tubes used in computer systems, televisions, or other devices. Also, elements in the cathode ray tube 20 shown in FIG. 2 that are not necessary for an understanding of the present invention are not described for simplicity.

As shown, the cathode ray tube 20 includes a neck portion 66, a yoke portion 76, and a funnel portion 86. As shown, the funnel portion 86 of the cathode ray tube 20 includes a front assembly 22 comprising a glass face plate 24. The glass face plate 24 includes an inner surface 26. A layer of display compound material areas, preferably phosphors, are comprised on the inner surface 26 of the glass face plate 24 of the cathode ray tube 20 forming an array of pixels. The display compound material areas are adapted to emit light of selected colors when scanned by an electron beam.

As noted above, the display compound material areas are preferably phosphors. In an embodiment, a centrally disposed phosphor screen 28 is comprised on the inner surface 26 of face place 24. The phosphor screen 28 comprises three different phosphors painted in fine patterns across the inner surface of the tube. These patterns are comprised of dots or stripes of the three additive primary colors, red, green and blue, arrayed next to each other. A grouping of three dots is referred to as a triad or color triplet, and a triad of dots forms a picture element referred to as a pixel. The centrally disposed phosphor screen 28 comprises an array of pixels, wherein the array of pixels includes a plurality of horizontal scan lines.

The funnel portion 86 also includes a shadow mask 50 which defines beam paths between electron guns 68 and the screen 28. The shadow mask 50 comprises a metal sheet including fine perforations located inside the display tube at a short distance behind the phosphor coating on the display screen 28. The shadow mask 50 is preferably critically arranged with the phosphor dot coating on the CRT screen 28 so that the respective electron beam only impacts phosphor dots of the respective color, i.e., the other two colors of dots are in the shadow of the mask 50 and are not affected by the electron beam. The shadow mask 50 thus prevents electron beams directed at respective dots comprising a triplet from spilling over and hitting other dots on the pixel triplet.

One or more electron guns 68 are comprised within the neck 66 of the tube 20 which provide three electron beams 70, 72 and 74 for exciting respective red, green and blue phosphor deposits comprised on the screen 28. The three electron beams 70, 72 and 74 pass through the yoke 76 and impact the phosphors on the screen 28. As discussed further below, the yoke 76 includes vertical positioning plates 112 and horizontal positioning plates (113, FIG. 3), also referred to as deflection plates, which operate to direct the path of the respective electron beams 70, 72 and 74 to respective phosphors on the phosphor screen 28.

The yoke portion 76 also includes vertical deflection circuitry 114 which provides signals to the vertical deflection plates 112 to control the vertical deflection plates 112. The signals provided by the vertical deflection circuitry 114 to the vertical deflection plates 112 control the electromagnetic output of the vertical deflection plates 112, thus affecting the path of the electron beams 70, 72, and 74. The yoke portion 76 also includes horizontal deflection circuitry (not shown) which provides signals to the horizontal deflection plates 113 to control the horizontal deflection plates 113.

The yoke 76 also includes a periodic waveform generator 102 which operates to superimpose a high frequency periodic wave over the signals provided to the vertical deflection plates 112. The waveform generator 102 is coupled to provide outputs to each of the vertical positioning plates 112. Alternatively, the waveform generator 102 is coupled to provide outputs to amplifier circuitry (not shown) which is coupled to each of the waveform generator 102 and the vertical deflection circuitry 114 and which in turn provides signals to the vertical deflection plates 112. The cathode ray tube 20 also preferably includes filtering circuitry 118 interposed between the waveform generator 102 and the vertical deflection plates 112.

Figure 7A:
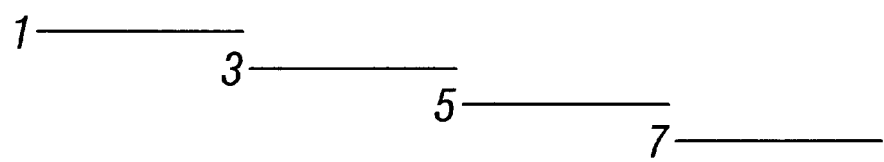
FIG. 7 illustrates voltages provided to the vertical deflection circuitry in the prior art and according to the present invention.
Figure 7B:
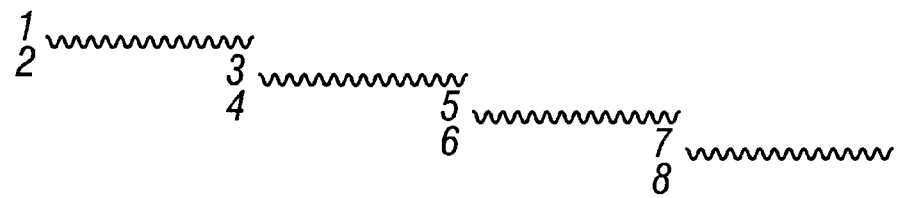

The waveform generation element 102 causes the electromagnetic output of the vertical positioning plates 112 to include a super-imposed high frequency periodic wave, as shown in FIG. 7B. This high frequency periodic wave provides improved resolution during low resolution modes, as discussed below.

FIGS. 3-4

Figure 3:
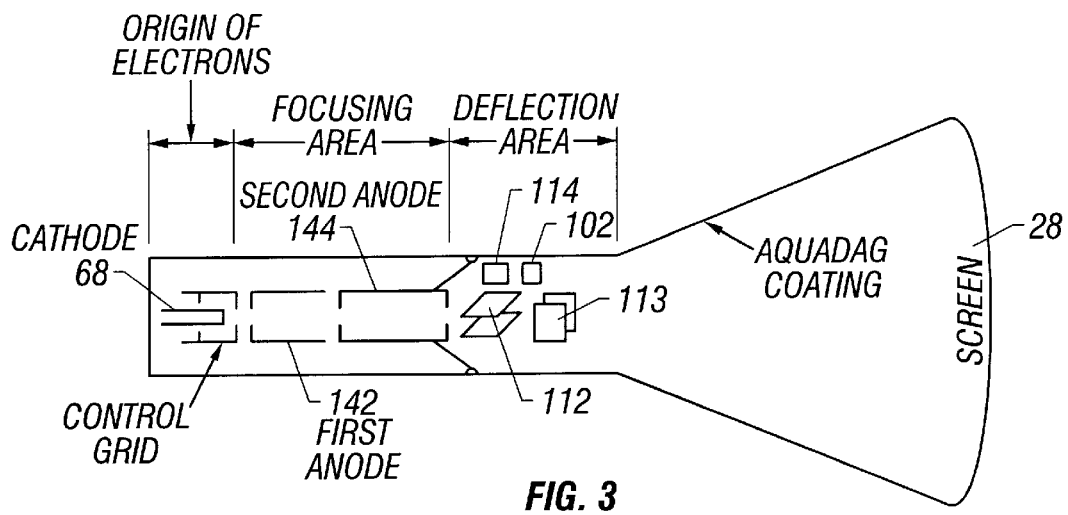
FIGS. 3 and 4 illustrate block diagrams of the cathode ray tube of FIG. 2.
Figure 4:
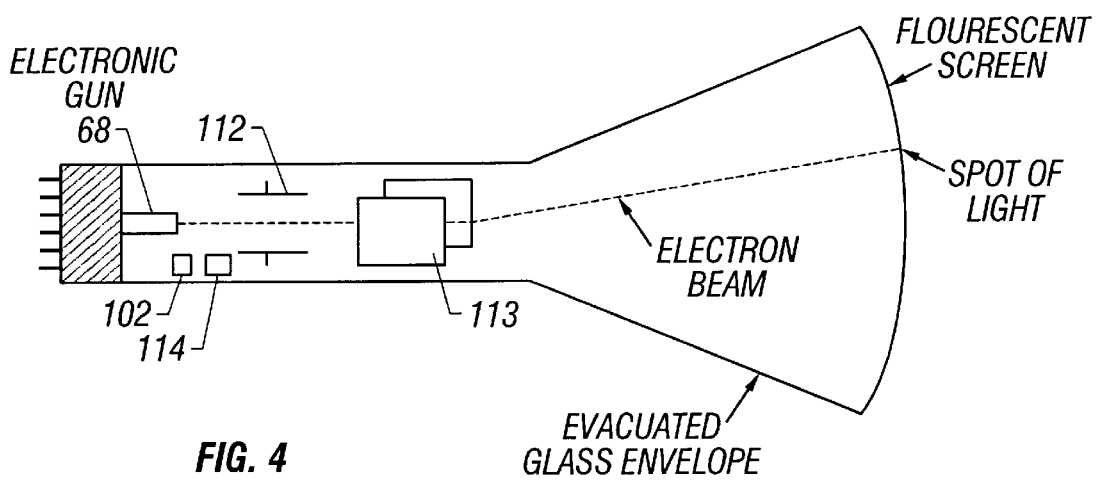

Referring now to FIGS. 3 and 4, block diagrams illustrating the cathode ray tube 20 of FIG. 2 is shown. As shown in FIG. 3, the electron gun or cathode 68 generates one or more electron beams through a first focusing anode 142 and a second accelerating anode 144. The electron beams are provided through the vertical deflection plates 112 and horizontal deflection plates 113 and impact the screen 28 as shown. The vertical deflection plates 112 and horizontal deflection plates 113 cause the electron beam to scan across the screen 28. FIG. 4 also shows the electron gun or cathode 68 generating one or more electron beams through vertical deflection plates 112 and horizontal deflection plates 113 to impact the screen 28.

As shown in FIGS. 3 and 4, the cathode ray tube 20 includes vertical deflection circuitry 114 which provides deflection information to the vertical deflection plates 112. The cathode ray tube 20 includes periodic wave generation circuitry or a periodic wave generator 102 which superimposes a high frequency periodic wave over the electric and/or magnetic signals provided by the vertical deflection circuitry 114 to the vertical deflection plates 112. The high frequency periodic wave is shown in FIG. 6.

Figure 6:
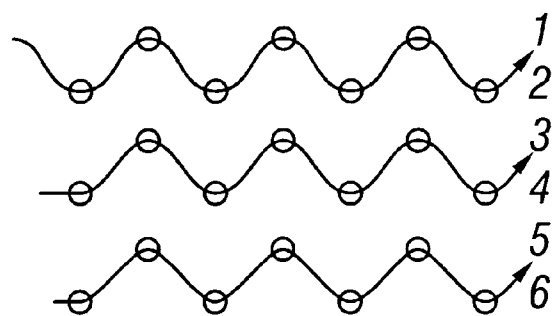
FIG. 6 illustrates a high frequency periodic wave form which is superimposed over the vertical positioning of the vertical deflection plates in the monitor of FIGS. 1 and 2.

The high frequency oscillator or periodic wave generator 102 is placed in parallel with existing vertical deflection circuitry 114, and, through superposition, creates the proper waveform shown in FIGS. 6 and 7B. In an alternate embodiment, the vertical deflection circuitry 114 generates signals to the vertical deflection plates 112 as shown in FIG. 7B which inherently include the high frequency periodic wave superimposed on the constant voltage for a respective scan line. In other words, the vertical deflection circuitry 114 generates signals to the vertical deflection plates 112 wave as shown in FIG. 7B which inherently include a superimposed high frequency periodic wave.

FIGS. 5-7

Figure 5:
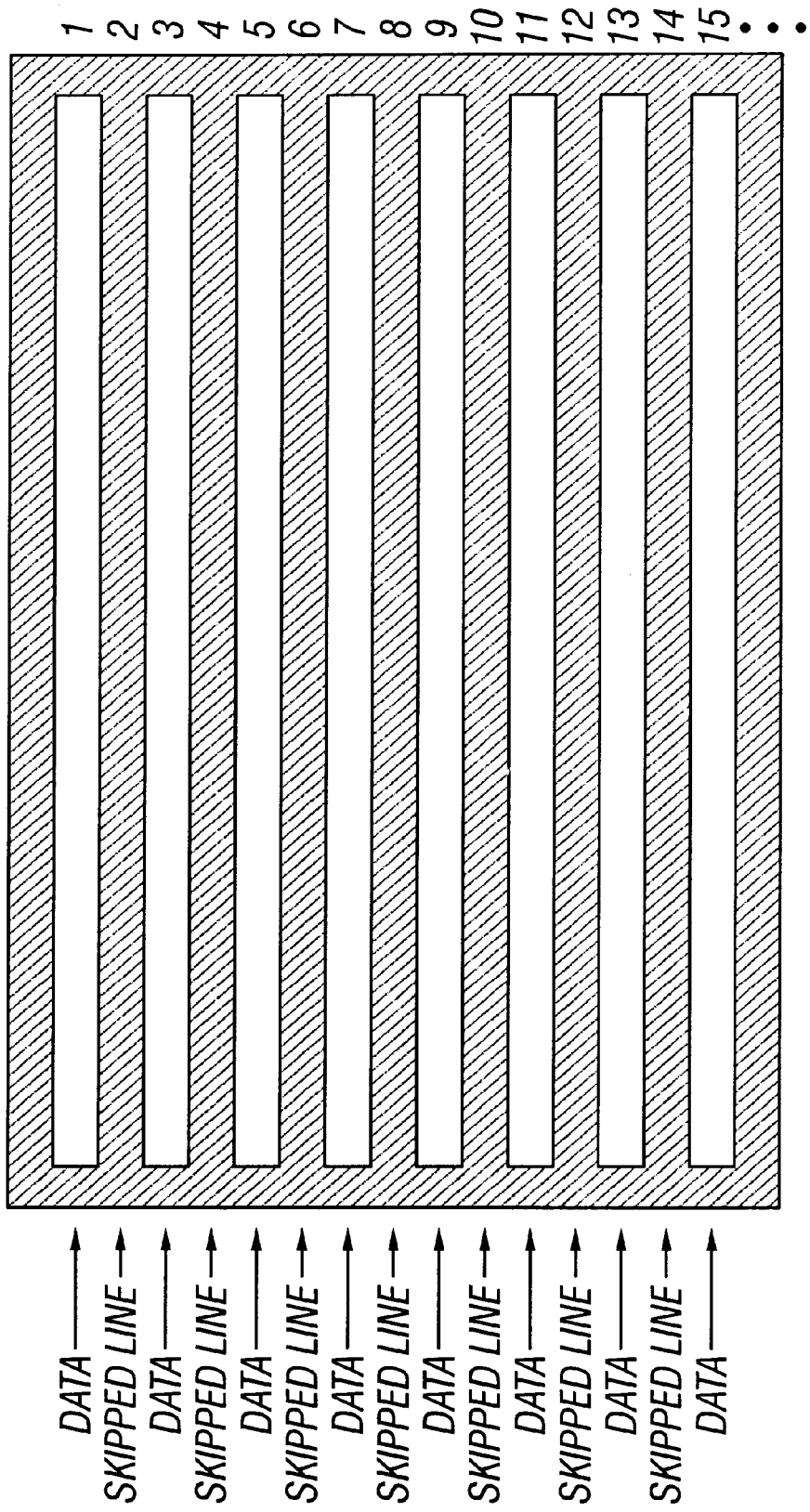
FIG. 5 illustrates a video display screen of a large video monitor in a low resolution mode including horizontal black stripes positioned between scan lines.

As discussed in the background section, on sufficiently large monitors, such as 21-inch computer system monitors, low resolution modes such as the VGA 720 by 400 pixel text mode show horizontal black stripes in between scan lines, as shown in FIG. 5. A similar effect also appears on TTL monochrome monitors. The black lines shown in FIG. 5 appear in large color monitors because the electron beam generated by the electrode is focused highly to perform optimally in high resolution modes. Thus, the lower the resolution, the larger the pixel required to avoid this phenomenon.

Therefore, a beam focused to perform optimally at high resolutions is too small to create a large dot properly in low resolution modes. Thus, during the low resolution modes, the black stripe effect shown in FIG. 5 appears in prior art monitors. As the resolution is increased, the black stripes shrink as the scan lines grow closer, and the black stripes eventually disappear when the number of horizontal lines become sufficiently numerous.

Therefore, the cathode ray tube 20 includes the vertical positioning periodic waveform generator 102 which operates during low resolution modes. The periodic waveform generator 102 superimposes a high frequency periodic wave over the vertical positioning provided by the monitor's vertical deflection plates. The high frequency waveform is preferably shaped as shown in FIG. 6.

FIG. 7A illustrates the path of an electron beam according to the prior art, wherein the path corresponds to a horizontal scan line, and FIG. 7B illustrates the path of the electron beam wherein the path includes the effects of a superimposed high frequency periodic wave.

As shown in FIG. 7A, in low resolution modes, the path of the electron beam may only illuminate certain (one or more) of the intended scan lines, i.e., certain lines may be missed. This is because the beam is focused to perform optimally at high resolutions and is too small to create a large dot properly in low resolution modes. Therefore, during low resolution modes, the black stripe effect shown in FIG. 5 appears in prior art monitors.

In FIG. 7B, the path of the electron beam is affected by the high frequency periodic wave, and thus the electron beam illuminates pixels in multiple adjacent scan lines, thus causing the black stripe phenomenon to disappear. More exactly, during low resolution modes, the high frequency periodic wave causes the electron beam generated in the cathode ray tube to pass through the shadow mask 50 in both the originally lit stripe and the black stripe shown in FIG. 5. When all of the pixels are thus struck, the black lines shown in FIG. 5 disappear. This creates the appearance of a larger electron beam without changing the electron gun or adding additional deflection hardware.

FIG. 7A also effectively illustrates the voltage provided by the vertical deflection circuitry 114 according to the prior art. During the scan of a horizontal scan line, the voltage provided by the vertical deflection circuitry 114 is constant to enable the electron beam to horizontally scan across the scan line. On the next scan line, the voltage provided by the vertical deflection circuitry 114 is adjusted slightly for the next scan line, and so on.

FIG. 7B effectively illustrates the voltage provided by the vertical deflection circuitry 114 and the waveform generator 102 according to the present invention. During the scan of a horizontal scan line, the voltage provided by the vertical deflection circuitry 114 and the waveform generator 102 comprises a high frequency periodic wave superimposed over the constant voltage shown in FIG. 7A. This enables the electron beam to impact multiple pixels in adjacent horizontal scan lines during each scan, thus removing the black line effect of FIG. 5.

In one embodiment, the high frequency periodic wave provided by the periodic waveform generator 102 and shown in FIG. 6 is adjusted based on certain factors. In one embodiment, the period and magnitude of the periodic wave are adjusted based on the resolution and monitor size, as desired. For example, as the monitor size and/or the resolution increases, the magnitude and period of the periodic wave are preferably correspondingly decreased.

Conclusion

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A video monitor having a plurality of video resolution modes and which operates with improved display performance in low resolution modes, comprising:

a cathode ray tube including a neck portion and a funnel portion, wherein said funnel portion includes a screen;

one or more electron guns comprised in said neck portion of said cathode ray tube which generate one or more electron beams, wherein said one or more electron beams impact said screen;

a layer of display compound material areas comprised on the screen of said cathode ray tube forming an array of pixels, said array of pixels comprising a plurality of horizontal scan lines, wherein said display compound material areas are adapted to emit light of selected colors when scanned by one of said one or more electron beams;

vertical deflection means positioned between said one or more electron guns and said screen, wherein said vertical deflection means includes one or more inputs for receiving vertical deflection information, wherein said vertical deflection means deflects paths of said one or more electron beams to cause said one or more electron beams to scan across said screen in accordance with said deflection information;

vertical deflection circuitry which provides an input to said one or more inputs of said vertical deflection means;

a shadow mask positioned between said vertical deflection means and said screen, wherein said shadow mask defines beam paths between said one or more electron guns and said screen; and a periodic waveform generator which provides a high frequency periodic waveform voltage to said vertical deflection means, wherein said periodic waveform generator operates in low resolution modes and wherein a period and a magnitude of a periodic wave are periodically adjusted based on a plurality of predetermined factors, said predetermined factors including size of said screen and resolution mode, the periodic adjustment increasing the magnitude and period of said periodic wave as the resolution decreases; and wherein, during low resolution modes, said vertical deflection means is responsive to inputs from said vertical deflection circuitry and said periodic waveform generator to cause said one or more electron beams to pass through the shadow mask and impact pixels in multiple adjacent scan lines of said screen.

2. The video monitor of claim 1, wherein said vertical deflection circuitry provides a constant voltage to said vertical deflection means during scanning of a horizontal scan line;

wherein said periodic waveform generator superimposes said high frequency periodic waveform voltage with said constant voltage provided to said vertical deflection means.

3. The video monitor of claim 1, wherein said periodic waveform generator adjusts said high frequency periodic waveform voltage provided to said vertical deflection means based on the video resolution mode of the video monitor.

4. The video monitor of claim 3, wherein said high frequency periodic waveform voltage has a period and a magnitude;

wherein said periodic waveform generator adjusts the period and the magnitude of said high frequency periodic waveform voltage provided to said vertical deflection means based on the video resolution mode of the video monitor.

5. The video monitor of claim 1, wherein the video monitor has a size;

wherein said periodic waveform generator adjusts said high frequency periodic waveform voltage provided to said vertical deflection means based on the video resolution mode of the video monitor and the size of the video monitor.

6. The video monitor of claim 5, wherein said high frequency periodic waveform voltage has a period and a magnitude;

wherein said periodic waveform generator adjusts the period and the magnitude of said high frequency periodic waveform voltage provided to said vertical deflection means based on the video resolution mode of the video monitor and the size of the video monitor.

7. The video monitor of claim 1, wherein said vertical deflection means comprises electromagnetic deflection plates.

8. The video monitor of claim 1, wherein said one or more electron beams are focused to perform optimally in high resolution modes.

9. The video monitor of claim 1, wherein said low resolution modes include a 640×480 resolution.

10. A video monitor having a plurality of video resolution modes and which operates with improved display performance in low resolution modes, comprising:

a cathode ray tube including a neck portion and a funnel portion, wherein said funnel portion includes a screen;

one or more electron guns comprised in said neck portion of said cathode ray tube which generate one or more electron beams, wherein said one or more electron beams impact said screen;

a layer of display compound material areas comprised on the screen of said cathode ray tube forming an array of pixels, said array of pixels comprising a plurality of horizontal scan lines, wherein said display compound material areas are adapted to emit light of selected colors when scanned by one of said one or more electron beams;

vertical deflection means positioned between said one or more electron guns and said screen, wherein said vertical deflection means includes one or more inputs for receiving vertical deflection information, wherein said vertical deflection means deflects paths of said one or more electron beams to cause said one or more electron beams to scan across said screen in accordance with said vertical deflection information;

a shadow mask positioned between said vertical deflection means and said screen, wherein said shadow mask defines beam paths between said one or more electron guns and said screen; and vertical deflection circuitry which provides an input to said one or more inputs of said vertical deflection means, wherein in low resolution modes, said vertical deflection circuitry outputs a voltage signal comprising a constant voltage and including a high frequency periodic waveform voltage superimposed on said constant voltage;

wherein, during low resolution modes, said vertical deflection means is responsive to input from said vertical deflection circuitry to cause said one or more electron beams to pass through the shadow mask and impact pixels in multiple adjacent scan lines of said screen; and wherein a period and a magnitude of a periodic wave are periodically adjusted based on a plurality of predetermined factors, said predetermined factors including size of said screen and resolution mode, the periodic adjustment increasing the magnitude and period of said periodic wave as the resolution decreases.

11. The video monitor of claim 10, wherein said vertical deflection circuitry adjusts said output voltage signal provided to said vertical deflection means based on the video resolution mode of the video monitor;

wherein said vertical deflection circuitry adjusts said high frequency periodic waveform voltage which is superimposed on said constant voltage.

12. The video monitor of claim 11, wherein said high frequency periodic waveform voltage has a period and a magnitude;

wherein said vertical deflection circuitry adjusts the period and the magnitude of said high frequency periodic waveform voltage based on the video resolution mode of the video monitor.

13. The video monitor of claim 10, wherein the video monitor has a size;

wherein said vertical deflection circuitry adjusts said high frequency periodic waveform voltage based on the video resolution mode of the video monitor and the size of the video monitor.

14. The video monitor of claim 13, wherein said high frequency periodic waveform voltage has a period and a magnitude;

wherein said vertical deflection circuitry adjusts the period and the magnitude of said high frequency periodic waveform voltage based on the video resolution mode of the video monitor and the size of the video monitor.

15. The video monitor of claim 10, wherein said vertical deflection means comprises electromagnetic deflection plates.

16. The video monitor of claim 10, wherein said one or more electron beams are focused to perform optimally in high resolution modes.

17. A video monitor having a plurality of video resolution modes and which operates with improved display performance in low resolution modes, comprising:

a cathode ray tube including a first end and a second end, wherein said second end includes a screen;

one or more electron guns comprised in said first end of said cathode ray tube which generate one or more electron beams, wherein said one or more electron beams impact said screen;

a layer of phosphor material areas comprised on the screen of said cathode ray tube forming an array of pixels, said array of pixels comprising a plurality of horizontal scan lines, wherein said phosphor material areas are adapted to emit light of selected colors when scanned by one of said one or more electron beams;

vertical deflection means positioned between said one or more electron guns and said screen, wherein said vertical deflection means includes one or more inputs for receiving vertical deflection information, wherein said vertical deflection means deflects paths of said one or more electron beams to cause said one or more electron beams to scan across said screen in accordance with said deflection information;

vertical deflection circuitry which provides an input to said one or more inputs of said vertical deflection means;

a shadow mask positioned between said vertical deflection means and said screen, wherein said shadow mask defines beam paths between said one or more electron guns and said screen; and a periodic waveform generator which provides a high frequency periodic waveform voltage to said vertical deflection means, wherein said periodic waveform generator operates in low resolution modes;

wherein, during low resolution modes, said vertical deflection means is responsive to inputs from said vertical deflection circuitry and said periodic waveform generator to cause said one or more electron beams to pass through the shadow mask and impact pixels in multiple adjacent scan lines of said screen; and wherein a period and a magnitude of a periodic wave are periodically adjusted based on a plurality of predetermined factors, said predetermined factors including size of said screen and resolution mode, the periodic adjustment increasing the magnitude and period of said periodic wave as the resolution decreases.

18. A computer system comprising:

a processor;

a memory coupled to the processor via a bus;

a video controller coupled to the processor;

a video monitor coupled to the video controller, the video monitor having a plurality of video resolution modes, the video monitor including:

a cathode ray tube including a neck portion and a funnel portion, wherein said funnel portion includes a screen;

one or more electron guns comprised in said neck portion of said cathode ray tube which generate one or more electron beams, wherein said one or more electron beams impact said screen;

a layer of display compound material areas comprised on the screen of said cathode ray tube forming an array of pixels, said array of pixels comprising a plurality of horizontal scan lines, wherein said display compound material areas are adapted to emit light of selected colors when scanned by one of said one or more electron beams;

vertical deflection means positioned between said one or more electron guns and said screen, wherein said vertical deflection means includes one or more inputs for receiving vertical deflection information, wherein said vertical deflection means deflects paths of said one or more electron beams to cause said one or more electron beams to scan across said screen in accordance with said deflection information;

vertical deflection circuitry which provides an input to said one or more inputs of said vertical deflection means;

a shadow mask positioned between said vertical deflection means and said screen, wherein said shadow mask defines beam paths between said one or more electron guns and said screen; and a periodic waveform generator which provides a high frequency periodic waveform voltage to said vertical deflection means, wherein said periodic waveform generator operates in low resolution modes;

wherein, during low resolution modes, said vertical deflection means is responsive to inputs from said vertical deflection circuitry and said periodic waveform generator to cause said one or more electron beams to pass through the shadow mask and impact pixels in multiple adjacent scan lines of said screen; and wherein a period and a magnitude of a periodic wave are periodically adjusted based on a plurality of predetermined factors, said predetermined factors including size of said screen and resolution mode, the periodic adjustment increasing the magnitude and period of said periodic wave as the resolution decreases.

19. The computer system of claim 18, wherein said vertical deflection circuitry provides a constant voltage to said vertical deflection means during scanning of a horizontal scan line;

wherein said periodic waveform generator superimposes said high frequency periodic waveform voltage with said constant voltage provided to said vertical deflection means.

20. The computer system of claim 18, wherein said periodic waveform generator adjusts said high frequency periodic waveform voltage provided to said vertical deflection means based on the video resolution mode of the video monitor.

21. The computer system of claim 20, wherein said high frequency periodic waveform voltage has a period and a magnitude;

wherein said periodic waveform generator adjusts the period and the magnitude of said high frequency periodic waveform voltage provided to said vertical deflection means based on the video resolution mode of the video monitor.

22. The computer system of claim 20, wherein:

said video monitor has a size; and said periodic waveform generator adjusts said high frequency periodic waveform voltage provided to said vertical deflection means based on the video resolution mode of the video monitor and the size of the video monitor.

23. The computer system of claim 22, wherein:

said high frequency periodic waveform voltage has a period and a magnitude; and said periodic waveform generator adjusts the period and the magnitude of said high frequency periodic waveform voltage provided to said vertical deflection means based on the video resolution mode of the video monitor and the size of the video monitor.

24. The computer system of claim 18, wherein said vertical deflection means comprises electromagnetic deflection plates.

25. The computer system of claim 18, wherein said one or more electron beams are focused to perform optimally in high resolution modes.

26. The computer system of claim 18, wherein said low resolution modes include a 640×480 resolution.

* * * * *